(12) United States Patent
Bose et al.

(10) Patent No.: US 9,154,800 B2
(45) Date of Patent: Oct. 6, 2015

(54) METHOD AND APPARATUS FOR A MEMORY EFFICIENT APPROACH FOR DECODING PROGRESSIVE JOINT PHOTOGRAPHIC EXPERTS GROUP (JPEG) IMAGES

(71) Applicant: Adobe Systems Incorporated, San Jose, CA (US)

(72) Inventors: Shiladitya Bose, Kolkata (IN); Vijay Kumar Sahu, Ghaziabad (IN); Sourav Sikdar, Kolkata (IN); Rahul Gupta, New Delhi (IN)

(73) Assignee: ADOBE SYSTEMS INCORPPORATED, San Jose, CA (US)

( * ) Notice: Subject to any disclaimer, the term of this patent is extended or adjusted under 35 U.S.C. 154(b) by 115 days.

(21) Appl. No.: 13/951,842

(22) Filed: Jul. 26, 2013

(65) Prior Publication Data

US 2015/0030245 A1    Jan. 29, 2015

(51) Int. Cl.
*G06K 9/36* (2006.01)
*H04N 19/34* (2014.01)
*H04N 19/60* (2014.01)
*H04N 19/44* (2014.01)
*H04N 19/426* (2014.01)

(52) U.S. Cl.
CPC ............ *H04N 19/34* (2014.11); *H04N 19/426* (2014.11); *H04N 19/44* (2014.11); *H04N 19/60* (2014.11)

(58) Field of Classification Search
None
See application file for complete search history.

(56) References Cited

U.S. PATENT DOCUMENTS

| 7,187,802 | B2* | 3/2007 | Ju ................................. 382/233 |
| 2006/0008161 | A1* | 1/2006 | Kaithakapuzha ............. 382/233 |
| 2008/0112629 | A1* | 5/2008 | Chen et al. .................... 382/233 |
| 2013/0022114 | A1* | 1/2013 | Lee et al. ................. 375/240.12 |

OTHER PUBLICATIONS

Kun-Bin Lee et al., "A Memory-Efficient Progressive JPEG Decoder", 4 pgs.

* cited by examiner

*Primary Examiner* — Li Liu
(74) *Attorney, Agent, or Firm* — Keller Jolley Preece

(57) ABSTRACT

A computer implemented method and apparatus for a memory efficient approach for decoding progressive JPEG images. The method comprises (a) accessing a progressive JPEG image, wherein the progressive JPEG image comprises a plurality of compressed scans and wherein each scan in the plurality of scans comprises a plurality of compressed rows of image data; (b) decompressing not more than half of the compressed rows of each scan in the plurality of scans into a memory buffer; (c) copying a remaining plurality of compressed rows of each scan in the plurality of scans into a plurality of small memory buffers; (d) decoding, in place, the decompressed rows in the memory buffer; and (e) repeating steps (b)-(d) until a predefined number of rows are remaining in the plurality of small memory buffers, at which time the remaining rows are decompressed and decoded.

20 Claims, 5 Drawing Sheets

METHOD AND APPARATUS FOR A MEMORY EFFICIENT APPROACH FOR DECODING PROGRESSIVE JOINT PHOTOGRAPHIC EXPERTS GROUP (JPEG) IMAGES

BACKGROUND OF THE INVENTION

1. Field of the Invention

Embodiments of the present invention generally relate to image compression and, more particularly, to a method and apparatus for a memory efficient approach for decoding progressive JPEG images.

2. Description of the Related Art

Image compression coding as specified by the Joint Photographic Expert Group (JPEG) is preferred in many applications. JPEG compression is an image compression technique that reduces files to about 5% of their original file size, with little perceptible loss in image quality. In order to view a JPEG compressed image (hereinafter called a JPEG) on the display of a computing device, the JPEG must be decompressed into a red/green/blue (RGB) color space before being applied to the display.

Progressive mode of JPEG compression divides the original image file into a series of sequential scans of digital image data, where each sequential scan provides progressively more detail of the original image. The progressive mode JPEG is able to display a rough approximation of the original image after a first of the sequential scans of the compressed data has been decoded, and the image quality is then gradually improved as more scans are decoded and the decoded data is added to the decoded data from the prior scans. Therefore, one can roughly view the image before all of the compressed data of the image is completely received and decompressed. When the JPEG is displayed on a client device, a JPEG decoder converts the scans to an uncompressed bitmap image. Decoding a progressive JPEG image is a memory intensive process. Some images cannot be opened on certain devices due to memory constraints.

Therefore, there is a need for a method and apparatus for a memory efficient approach for decoding progressive JPEG images.

SUMMARY OF THE INVENTION

A method and apparatus for a memory efficient approach for decoding progressive JPEG images substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

While the method and apparatus is described herein by way of example for several embodiments and illustrative drawings, those skilled in the art will recognize that the method and apparatus for a memory efficient approach for decoding progressive JPEG images is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for a memory efficient approach for decoding progressive JPEG images defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
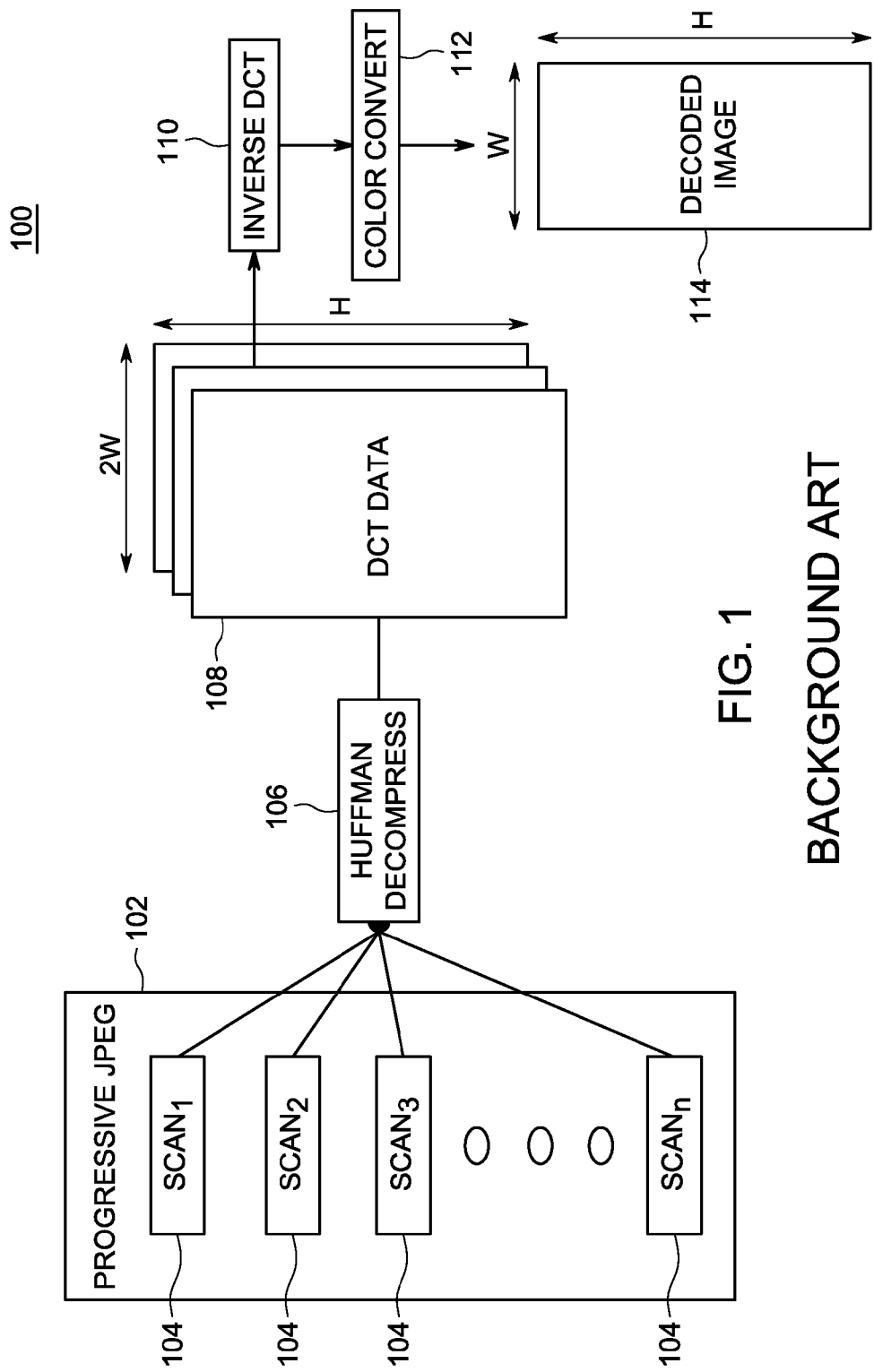
FIG. 1 depicts a typical pipeline currently used for decoding a progressive JPEG.

Embodiments of the present invention include a method and apparatus for a memory efficient approach for decoding progressive JPEG images. FIG. 1 depicts a typical pipeline 100 currently used for decoding a progressive JPEG 102, wherein all scans 104 of the progressive JPEG are decoded to their final pixel values. Huffman decompression is a decompression method known to those of ordinary skill in the art. Huffman decompression 106 decompresses all of the scans 104 of the progressive JPEG 102, leaving the decoded image data as discrete cosine transform (DCT) data 108, as is known in the art. However, to display the image on a computer display, the image must be converted to, for example, an RGB color space so it can be viewed on a computer display. To converting the DCT data 108 to RGB color space, an Inverse Discrete Cosine Transform (IDCT) algorithm 110 is used. The IDCT algorithm 110 converts the DCT data 108 to a color space, which may be a $YC_bC_r$ color space, which is encoded RGB information or other color space, such as CMYK color space. A color conversion 112 is then performed on the YCBR color space data to finally generate the decoded RGB image 114. Regardless, of the compression method, this decompression pipeline 100 is the most commonly used by those skilled in the art.

Typically, the amount of memory required to decode a progressive JPEG using this method is twice that of the original image. For example, an image with dimensions 7240× 5433 (in pixels) requires a client buffer of 3×7240×5433=112 MB, where three is the number of color channels, in this case 3 corresponds to red, green, and blue from the RGB color space. If the image were in a cyan, magenta, yellow, and key (CYMK) color space, the number of channels is 4. If the image were in grayscale, the number of channels is 1. The internal memory required to hold the DCT data as it is decompressed is twice that, or 224 MB. As shown in FIG. 1, a memory of size w by h would be insufficient, and thus must be 2 w by h in order to hold the DCT Data as it is decompressed. This requires a total memory usage of 337 MB to decode a 112 MB image.

This is a large demand for memory on a client device. Some images cannot be opened on certain devices due to memory constraints.

The embodiments of the present invention access a progressive JPEG image in a sequentially forward manner and decode the image in a memory buffer of an order of memory required to hold the uncompressed raw data of the image. The embodiments access a progressive JPEG, which includes a plurality of scans. Each scan includes a plurality of rows of compressed data. The compressed data is Huffman encoded. In some embodiments, 50% of the rows of each scan are decompressed into a DCT memory buffer of a computing device, while storing the remaining rows of each scan in individual small memory buffers. In other embodiments, less than 50% of the rows of each scan are decompressed into the DCT memory buffer. The DCT memory buffer is the amount of memory required to hold the final raw data in pixels for the image of a given height (h) and width (w), for example, w×h×number of color channels (for example, 3 for RGB). If 50% of the rows are decompressed and then decoded, in place, into a proper color space for the computing device, for example, the RGB color space, then the decoding frees up half of the space in the DCT memory buffer, such that 50% of the remaining rows, comprising 25% of the original rows, may be decompressed from the smaller memory buffers into the now free space in the DCT memory buffer. The 50% of the remaining rows are decoded in place, freeing up more space in the DCT memory buffer. The process iterates by sequentially decompressing 50% of the remaining rows from the small memory buffers and decoding them in place in the DCT memory buffer until the entire JPEG image is decoded. Thus, as long as not more than 50% of the rows are decompressed and decoded at each iteration, the embodiments provide a method of decoding progressive JPEGs with minimal memory requirements beyond that of the decoded image.

Advantageously, the present invention may be implemented as a shared library for use by applications that display images, such as ADOBE® ILLUSTRATOR®, PHOTOSHOP®, LIGHTROOM®, ACROBAT®, ADOBE® Bridge, ADOBE® MUSE™, INDESIGN®, ADOBE® REVEL®, and the like. The embodiments can decompress progressive JPEG images with minimal memory requirements. For example, an image may have a height of 5433 pixels and a width of 7240 pixels and a file size of 1.36 MB. Decoding the image into an RGB color space using the present invention uses a DCT memory buffer of approximately 112 MB and additional memory for the small memory buffers that is approximate half of the file size, equaling 0.68 MB, or less than 1 MB for a total of 113 MB, compared to a current decoder, which would require 337 MB.

Additionally, the present invention does not adversely impact the order of the speed at which images are decompressed. While requiring far less memory to decompress progressive JPEG images, the present invention adds no noticeable processing time to the decompression.

Various embodiments of a method and apparatus for a memory efficient approach for decoding progressive JPEG images are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 2:
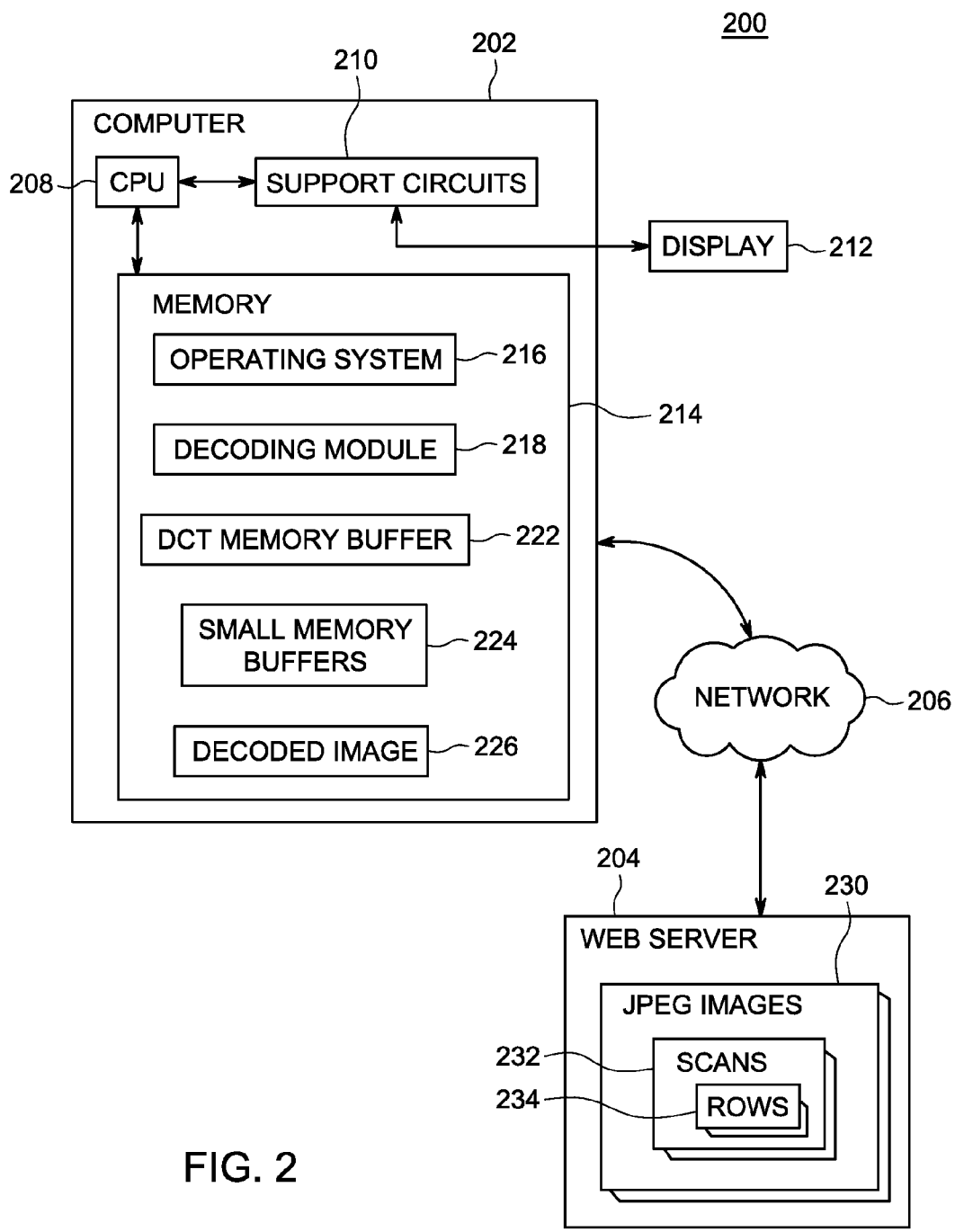
FIG. 2 is a block diagram of an apparatus for a memory efficient approach for decoding progressive JPEG images, according to one or more embodiments.

FIG. 2 is a block diagram of an apparatus 200 for a memory efficient approach for decoding progressive JPEG images, according to one or more embodiments. The apparatus 200 includes a computer 202 and a web server 204, communicatively coupled to one another via a network 206. The computer 202 is a computing device, such as a desktop computer, laptop, tablet computer, mobile phone, and the like, for rendering a progressive JPEG image. The computer 202 includes a Central Processing Unit (CPU) 208, a memory 214, and support circuits 210 connected to a display unit 212. The CPU 208 may include one or more commercially available microprocessors or microcontrollers that facilitate data processing and storage. The various support circuits 210 facilitate the operation of the CPU 208 and include one or more clock circuits, power supplies, cache, input/output circuits, and the like. The memory 214 includes at least one of Read Only Memory (ROM), Random Access Memory (RAM), disk drive storage, optical storage, removable storage and/or the like.

The memory 214 includes an operating system 216, a decoding module 218, a DCT memory buffer 222, a plurality of small memory buffers 224, and a decoded image 226. The operating system 216 may include various commercially known operating systems.

The network 206 includes a communication system that connects computers (or devices) by wire, cable, fiber optic and/or wireless link facilitated by various types of well-known network elements, such as hubs, switches, routers, and the like. The network 206 may be a part of the Intranet using various communications infrastructure, such as Ethernet, Wi-Fi, a personal area network (PAN), a wireless PAN, Bluetooth, Near field communication, and the like. The web server 204 includes a plurality of JPEG images 230. Each JPEG image 230 includes a plurality of scans 232. Each scan 232 includes a plurality of rows 234 of image data.

The decoding module 218 receives a JPEG image 230 from the web server 204. The JPEG image 230 is a progressive JPEG. A progressive JPEG is a JPEG image that has the original image file divided into a series of sequential scans of digital image data, where each sequential scan provides progressively more detail of the original image. The JPEG image has a width (w) and a height (h) (in pixels). The decoding module 218 creates a DCT memory buffer 222 for each channel (color space data) having a size of w×h×number of color channels (e.g., 3 for RGB color space) of the JPEG image 230 and decompresses 50% of the rows 234 of each scan 232 in the DCT memory buffer 222. In some embodiments, the rows 234 are decompressed using Huffman decompression. Huffman decompression produces discrete cosine transform (DCT) data. Because DCT data resulting from the Huffman compression requires 2 bytes for each byte of red/green/blue (RGB) color space data, decoding half of the rows takes the space of the decoded JPEG image. Thus, the amount of DCT data that can be held in the DCT memory buffer 222 of size w×h for a JPEG image of width w and height h, corresponds to w*(h/2) of the image. In other words, the DCT data for 50% of the rows can be held in a memory of a size equal to the full image. The remaining rows of each scan are stored in small memory buffers. A small memory buffer 224 is created for each of the scans 232 to hold the remaining rows 234 of each scan 232. The memory required to store these remaining rows 234 is very small because the scans 232 are still compressed and hold at most 50% of the compressed data of one scan 232.

The decoding module 218 decodes, in place, the 50% of the rows 234 in the DCT memory buffer 222. In some embodiments, an Inverse Discrete Cosine Transform (IDCT) is performed followed by a color conversion on the DCT data, as is well known to one of ordinary skill in the art. Decoding leaves w×h/2 amount of free space available in the DCT memory buffer. This space is sufficient to hold the DCT data for w×h/4 of the image. The decoding module 218 decompresses 50% of the remaining rows 234 (25% of the total image) of each scan 232 stored in the small memory buffers 224 into the now free space in the DCT memory buffer 222 and decodes the rows 234 in place as described above. This process leaves w×h/4 amount of free space in the DCT memory buffer 222. The decoding module 218 decompresses 50% of the remaining rows 234 of each scan 232 stored in the small memory buffers 224 into the remaining free space of the DCT memory buffer 222 and decodes rows 234 in place. The process iterates until a predefined number of rows 234, for example, 8 rows, remain in the small memory buffers 224 at which time the remaining rows 234 are decompressed and decoded. The result is a fully decoded JPEG image 226.

Figure 3:
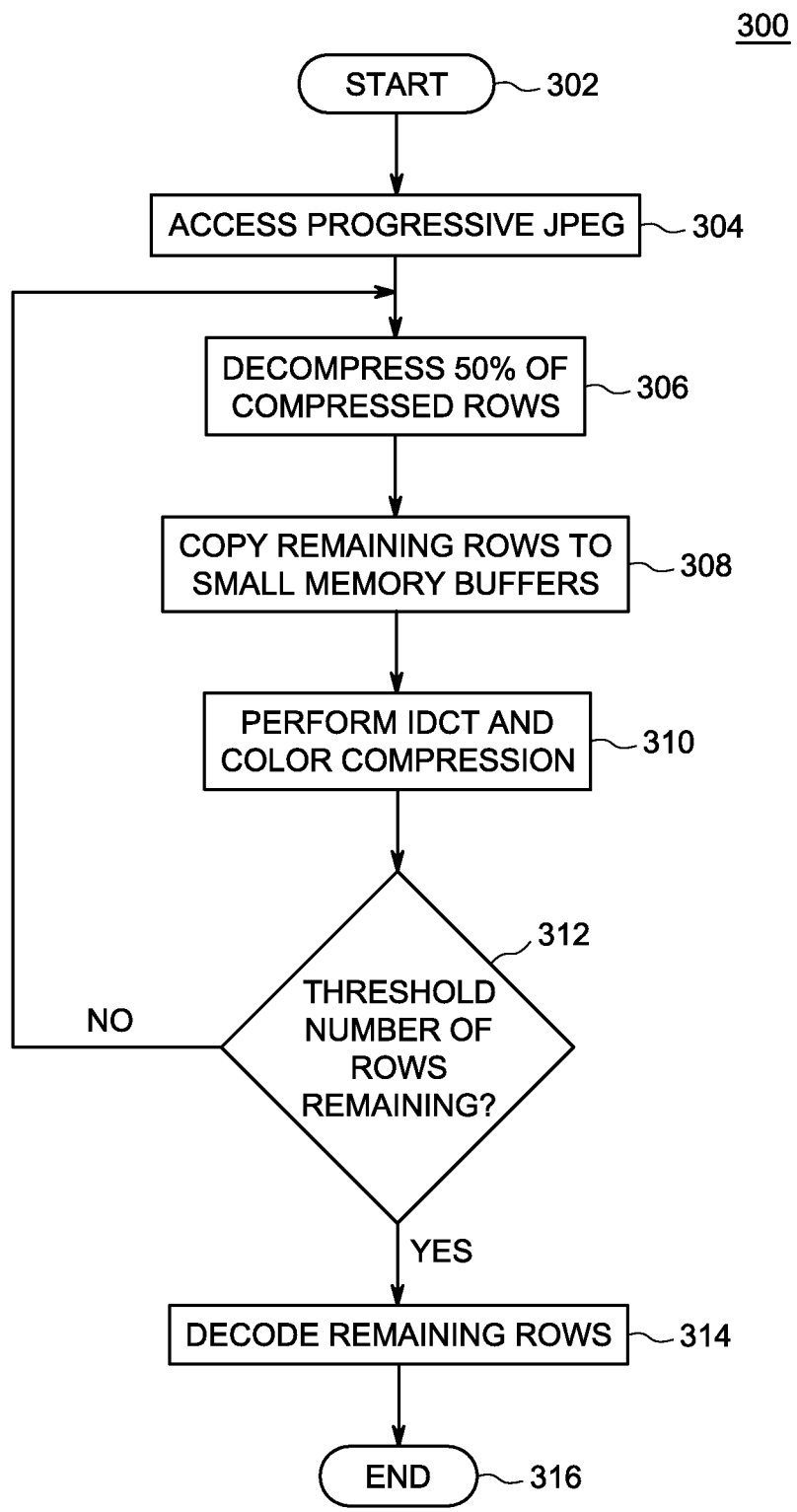
FIG. 3 is a flowchart of a method for decoding a progressive JPEG as performed by the decoding module of FIG. 2, according to one or more embodiments.

FIG. 3 is a flowchart of a method 300 for decoding a progressive JPEG as performed by the decoding module 218 of FIG. 2, according to one or more embodiments. The method 300 iteratively decodes 50% of the compressed rows in the scans in place in a memory buffer until all compressed rows are decoded. The method 300 requires minimal additional memory beyond the memory required for the decoded image. The method 300 starts at step 302 and proceeds to step 304.

At step 304, the method 300 accesses a progressive JPEG.

The JPEG image is a progressive JPEG. The progressive JPEG includes a plurality of scans and each scan includes a plurality of rows. The JPEG image has a width w and height h measured in pixels).

The method 300 proceeds to step 306, where the method 300 decompresses 50% of the compressed rows of each scan. The method 300 creates a DCT memory buffer for each color channel that is the width and height of the original JPEG image before it was compressed. The method 300 decompresses 50% of the rows of each scan into the DCT memory buffer. In some embodiments, the method 300 decompresses less than 50% of the rows, according to the rule that no more than 50% of the compressed rows are decompressed at a given iteration of the method. In some embodiments, the method 300 decompresses the rows using Huffman decompression, a decompression method well known in the art. Huffman decompression produces discrete cosine transform (DCT) data. Each scan includes a plurality of DCT blocks that are 8 by 8 pixel blocks. Each DCT block within a scan includes one DC coefficient and 63 AC coefficients. The DC coefficient represents the average color of the 8 by 8 DCT block and is located in the top left pixel of the 8 by 8 block. The DC coefficients are encoded in the DCT data of the first scan. Hence, the first scan is referred to as the DC scan. In some embodiments, there can exist multiple DC scans without deviating from the present invention.

When the DC coefficients are encoded in DCT data, the difference in the DC coefficients is stored. For example, a DC coefficient for a first DCT block may be 5 and a DC coefficient for a second DCT block may be 6. The method 300 encodes the first DC coefficient as 5, but encodes the second DC coefficient as 1, which is the difference between the DC coefficient of the first block and the DC coefficient of the second block.

The DCT data resulting from the Huffman compression requires 2 bytes for each byte of red/green/blue (RGB) color space data. Thus, the amount of DCT data that can be held in the DCT memory buffer of size w by h for a JPEG image of width w and height h, corresponds to w*(h/2), or half of the image. In other words, the DCT data for only 50% of the rows can be held in a memory of a size equal to the original image.

The method 300 proceeds to step 308, where the method 300 creates a small memory buffer for each scan. There is a one-to-one correspondence of scans to small memory buffers. The method 300 stores the last decoded DC coefficient of the DC scan in the first two bytes of the first small memory buffer (i.e., the small memory buffer corresponding to the DC scan), so that the method 300 has a reference when later decoding the remaining rows. The method 300 then stores the remaining rows from the DC scan in the first small memory buffer. The method 300 stores the remaining rows from the remaining scans (after half of the rows are removed for decompression) into the scan's corresponding small memory buffer. The memory required to store these remaining rows is very small because the scans are still compressed.

The method 300 proceeds to step 310, where the method 300 decodes the rows that have been decompressed in the DCT memory buffer. In some embodiments, an Inverse Discrete Cosine Transform (IDCT) is performed followed by a color conversion on the DCT data, as is well known to one of ordinary skill in the art. After the first iteration, decoding leaves w*h/2 amount of free space available in the DCT memory buffer. This space is sufficient to hold the DCT data for w*h/4 of the image, as described in further detail with respect to FIGS. 4A and 4B, below.

The method 300 proceeds to step 312, where the method 300 determines whether there are more than a predefined number of rows, for example, 8 rows, remaining in the small memory buffers. If the method 300 determines that there are more than the predefined number of rows remaining in the small memory buffer, the method 300 proceeds to step 306 and iterates until there are not more than the predefined number of rows remaining in the small memory buffer. Each time the decoding of the DC scan restarts, the stored DC coefficient value is used for initialization. However, if at step 312, the method 300 determines that there are not more than a predefined number of rows remaining in the small memory buffers, the method 300 proceeds to step 314.

At step 314, the method 300 decompresses all remaining rows from the small memory buffers into the remaining space in the DCT memory buffer, decodes them in place as described with respect to step 310, above. The result is a fully decoded JPEG image. The method 300 proceeds to step 316 and ends.

Figure 4A:
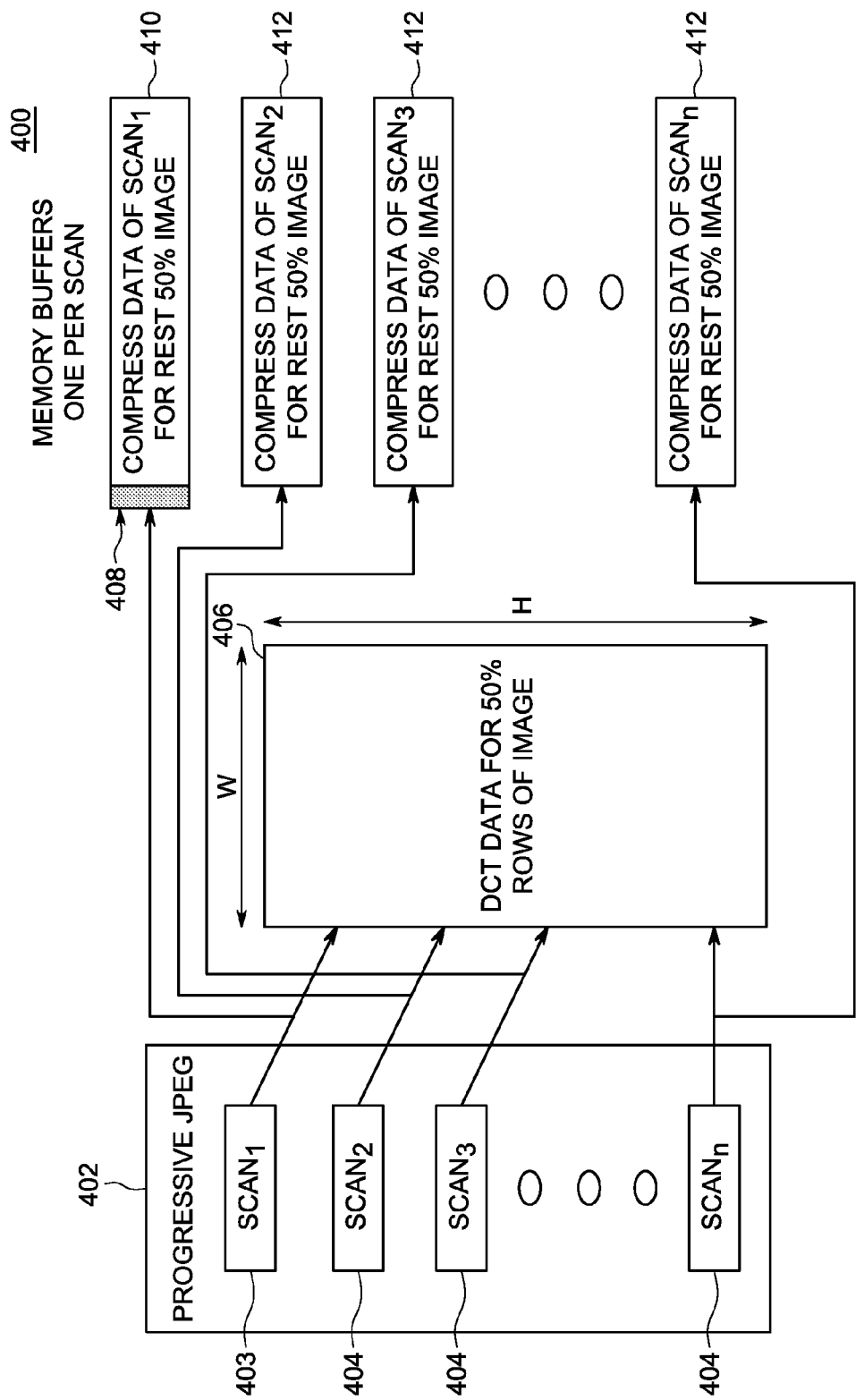
FIGS. 4A-4B illustrate a pipeline for decoding a progressive JPEG as performed by the method of FIG. 3, according to one or more embodiments.
Figure 4B:
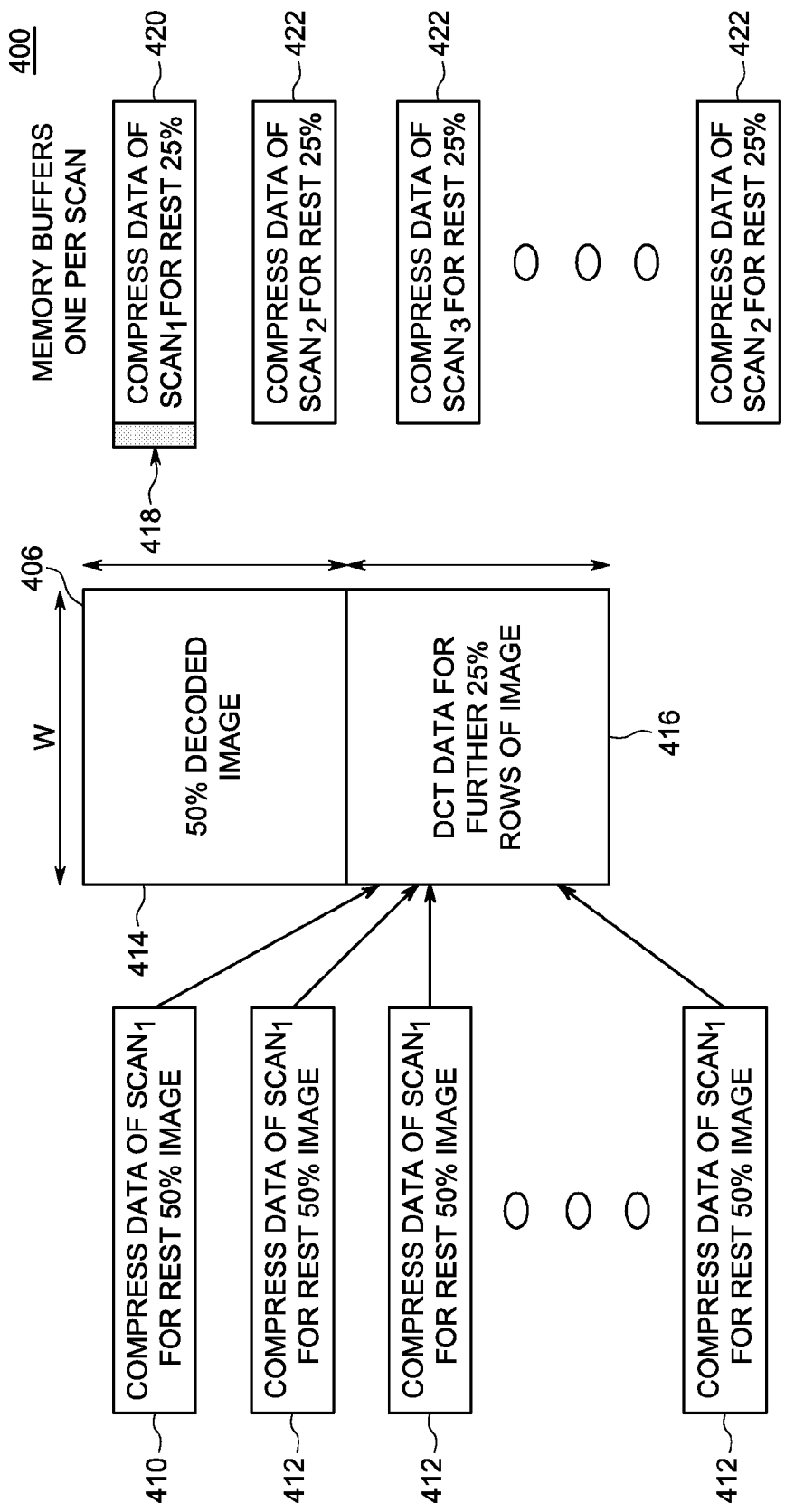

FIGS. 4A-4B illustrate a pipeline 400 for decoding a progressive JPEG as performed by the method 300 of FIG. 3, according to one or more embodiments. FIG. 4A illustrates the pipeline 400 including a progressive JPEG 402, which includes a DC scan 403, a plurality of scans 404; each scan 404 including a plurality of rows (not shown). The pipeline 400 also includes a DCT memory buffer 406, a small memory buffer 410 that corresponds to the DC scan 403, and a plurality of small memory buffers 412. A last decoded DC coefficient is stored in the first two bytes 408 of the small memory buffer 410.

When the progressive JPEG 402 is accessed, 50% of the rows of the compressed scans 404 are decompressed into the DCT memory buffer 406. The DCT memory buffer 406 is the width, W and the height, H of the decoded JPEG image. The DCT data resulting from decompressing the 50% of the rows takes up the entire DCT memory buffer 406. As described above, the DCT data takes up twice the space as the decoded image. Therefore, half of the rows of the compressed scans 404 take up the space of the entire decoded image. The compressed rows that are remaining from each scan 404 are stored in corresponding small memory buffers 408.

FIG. 4B illustrates the pipeline 400 after the DCT data for 50% of rows (shown in FIG. 4A) are decoded. The pipeline 400 includes the small memory buffers 410, 412 that include the remaining rows from the scans from the previous iteration, the DCT memory buffer 406, and small memory buffers 420, 422. After the DCT data for 50% of the rows are decoded, they take up the space 414 of half of the original image. Before decoding, the decompressed DCT data took up 2 bytes of space for each byte of the decoded image. After decoding, half of the DCT memory buffer 406 is freed up leaving space 416 for decompressing additional rows from each scan 403, 404 to be received from the small buffers 408. Thus, 50% of the remaining rows (corresponding to 25% of the image) from the small memory buffers 410, 412 are decompressed into the free space 416 of the DCT buffer. The remaining rows from the small memory buffers 410, 412 are stored in small memory buffers 420, 422. The first two bytes 418 of small memory buffer 420 store the last decoded DC coefficient from the first small memory buffer, 410, which represents the remaining rows from the DC scan 403 of FIG. 4A.

The process iterates, filling the next 12.5% of the image, then 6.25% of the image and so on until a predefined number of rows remain in the small memory buffers 420, 422, at which time all of the remaining rows are decompressed into the DCT memory buffer 406, and then decoded. The result at that point is a fully decoded image. The only memory required in addition to the DCT memory buffer is the small memory buffers that hold small amounts of compressed data.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a progressive JPEG image, wherein the progressive JPEG image comprises a plurality of compressed scans and wherein each compressed scan in the plurality of compressed scans comprises a plurality of compressed rows of image data;
decompressing not more than half of the compressed rows of each compressed scan in the plurality of compressed scans into a memory buffer;
copying a remaining plurality of compressed rows of each compressed scan in the plurality of compressed scans into a plurality of small memory buffers;
decoding, in place, the decompressed rows in the memory buffer;
storing the decoded decompressed rows in the memory buffer;
decompressing, from the small memory buffers, not more than half of the remaining compressed rows of each compressed scan in the plurality of compressed scans into the memory buffer;
decoding the rows decompressed from the plurality of small memory buffers in the memory buffer;
storing the decoded rows decompressed from the plurality of small memory buffers in the memory buffer; and
repeating the steps of decompressing, decoding, and storing the remaining compressed rows in the plurality of small memory buffers until a predefined number of rows are remaining in the plurality of small memory buffers, at which time the remaining rows are decompressed and decoded.

2. The method of claim 1, wherein there is a one-to-one correspondence between each compressed scan in the plurality of compressed scans and each small memory buffer in the plurality of small memory buffers.

3. The method of claim 1, wherein the JPEG image comprises a height and a width, and a size of the memory buffer is calculated as the height times the width times a number of color channels of the JPEG image.

4. The method of claim 1, wherein decoding, in place, comprises performing, an inverse discrete cosine transform and color conversion on the decompressed TOWS.

5. The method of claim 1, wherein decompressing is performed using Huffman decompression.

6. The method of claim 1, wherein an amount of memory required for decoding the progressive JPEG, in addition to the memory buffer, is equal to half of a file size of the JPEG image.

7. A system for decoding progressive JPEG images comprising:
at least one processor; and
at least one non-transitory computer readable storage medium storing instructions thereon that, when executed by the at least one processor, cause the system to perform the steps of:
accessing a progressive JPEG image, wherein the progressive JPEG image comprises a plurality of compressed scans and wherein compressed scans in the plurality of compressed scans comprises a plurality of compressed rows of image data;
decompressing not more than half of the compressed rows of the compressed scans in the plurality of compressed scans into a memory buffer;
copying a remaining plurality of compressed rows of the compressed scans in the plurality of compressed scans into a plurality of small memory buffers;
decoding, in place, the decompressed rows in the memory buffer, wherein decoding the decompressed rows in the memory buffer frees up at least half of the space in the memory buffer by replacing the decompressed rows with decoded data;
storing the decoded decompressed rows in the memory buffer;
decompressing, from the small memory buffers, not more than half of the remaining compressed rows of each compressed scan in the plurality of compressed scans into the memory buffer;
decoding, in place, the rows decompressed from the plurality of small memory buffers in the memory buffer, wherein decoding the decompressed rows in the memory buffer frees up at least half of the remaining space in the memory buffer by replacing the decompressed rows with decoded data; and
repeating the steps of decompressing, decoding, and storing the remaining compressed rows in the plurality of small memory buffers until a predefined number of rows are remaining in the plurality of small memory buffers, at which time the remaining rows are decompressed and decoded.

8. The system of claim 7, wherein there is a one-to-one correspondence between the compressed scans in the plurality of compressed scans and the small memory buffer in the plurality of small memory buffers.

9. The system of claim 7, wherein the JPEG image comprises a height and a width, and a size of the memory buffer is calculated as the height times the width times a number of color channels of the JPEG image.

10. The system of claim 7, wherein decompressing is performed using Huffman decompression, and wherein decoding, in place, comprises performing, an inverse discrete cosine transform and color conversion on the decompressed TOWS.

11. The system of claim 7, wherein an amount of memory required for decoding the progressive JPEG, in addition to the memory buffer, is equal to half of a file size of the JPEG image.

12. A non-transitory computer readable medium storing computer instructions that, when executed by at least one processor causes the at least one processor to perform a method for a memory efficient approach for decoding progressive JPEG images comprising:
accessing a progressive JPEG image, wherein the progressive JPEG image comprises a plurality of compressed scans and wherein each compressed scan in the plurality of compressed scans comprises a plurality of compressed rows of image data;

decompressing not more than half of the compressed rows of each compressed scan in the plurality of compressed scans into a memory buffer;

copying a remaining plurality of compressed rows of each compressed scan in the plurality of compressed scans into a plurality of small memory buffers;

decoding, in place, the decompressed rows in the memory buffer;

storing the decoded decompressed rows in the memory buffer;

decompressing, from the small memory buffers, not more than half of the remaining compressed rows of each compressed scan in the plurality of compressed scans into the memory buffer;

decoding the rows decompressed from the plurality of small memory buffers in the memory buffer;

storing the decoded rows decompressed from the plurality of small memory buffers in the memory buffer; and repeating the steps of decompressing, decoding, and storing the remaining compressed rows in the plurality of small memory buffers until a predefined number of rows are remaining in the plurality of small memory buffers, at which time the remaining rows are decompressed and decoded.

13. The computer readable medium of claim 12, wherein there is a one-to-one correspondence between each compressed scan in the plurality of compressed scans and each small memory buffer in the plurality of small memory buffers.

14. The computer readable medium of claim 12, wherein the JPEG image comprises a height and a width, wherein a size of the memory buffer is calculated as the height times the width times a number of color channels of the JPEG image.

15. The computer readable medium of claim 12, wherein decompressing is performed using Huffman decompression.

16. The method of claim 1, wherein decoding the decompressed rows in the memory buffer frees up at least half of the space in the memory buffer.

17. The method of claim 1, wherein, repeating the step of decompressing comprises decompressing not more than half of the compressed rows of each compressed scan in the plurality of compressed scans copied into the plurality of small memory buffers into a portion of the memory buffer that was freed up upon decoding the decompressed rows previously in the memory buffer.

18. The method of claim 1, wherein decompressing not more than half of the compressed rows of each compressed scan in the plurality of compressed scans into a memory buffer comprises decompressing an amount of compressed rows of each compressed scan in the plurality of compressed scans into the memory buffer, until the memory buffer is full.

19. The computer readable medium of claim 12, wherein a size of the memory buffer is calculated as the height times the width times a number of color channels of the JPEG image.

20. The computer readable medium of claim 12, wherein decoding comprises performing, an inverse discrete cosine transform and color conversion on the decompressed rows.

* * * * *